(12) United States Patent
Houzyou et al.

(10) Patent No.: US 10,302,954 B2
(45) Date of Patent: May 28, 2019

(54) IMAGE DISPLAY DEVICE

(71) Applicant: NIPPON CARBIDE INDUSTRIES, CO., INC., Minato-ku, Tokyo (JP)

(72) Inventors: Takuma Houzyou, Namerikawa (JP); Chihiro Hayashi, Namerikawa (JP)

(73) Assignee: NIPPON CARBIDE INDUSTRIES CO., INC., Tokyo (JP)

( * ) Notice: Subject to any disclaimer, the term of this patent is extended or adjusted under 35 U.S.C. 154(b) by 0 days.

(21) Appl. No.: 15/577,914

(22) PCT Filed: Jun. 10, 2016

(86) PCT No.: PCT/JP2016/067437
§ 371 (c)(1),
(2) Date: Nov. 29, 2017

(87) PCT Pub. No.: WO2016/199917
PCT Pub. Date: Dec. 15, 2016

(65) Prior Publication Data
US 2018/0157049 A1 Jun. 7, 2018

(30) Foreign Application Priority Data

Jun. 12, 2015 (JP) .................. 2015-119733
Jul. 30, 2015 (JP) .................. 2015-151008

(51) Int. Cl.
*G02B 27/09* (2006.01)
*G02B 5/124* (2006.01)
(Continued)

(52) U.S. Cl.
CPC ......... *G02B 27/0977* (2013.01); *G02B 5/124* (2013.01); *G02B 27/2292* (2013.01); *G02B 27/24* (2013.01); *G03B 21/2006* (2013.01)

(58) Field of Classification Search
CPC ........ G02B 5/045; G02B 5/124; G02B 5/136; G02B 5/0231; G02B 5/3033; G02B 27/24; G02B 27/283; G02B 27/0977
See application file for complete search history.

(56) References Cited

U.S. PATENT DOCUMENTS 4,025,159 A   5/1977   McGrath
4,486,363 A   12/1984  Pricone et al.
(Continued)

FOREIGN PATENT DOCUMENTS

CA   2 295 071   1/1999
CA   2 372 421   10/2001
(Continued)

OTHER PUBLICATIONS

JISK 7105, (Section 5.1, 5.5).
JIS Z 9117-(2011, (Section 3.7, 3.9, 8.3).

Primary Examiner — Sultan Chowdhury
(74) Attorney, Agent, or Firm — Venable LLP

(57) ABSTRACT

An image display device includes a half mirror, an image output device configured to output a light beam to one face of the half mirror, and a retroreflective member configured to retroreflect at least one of a light beam mirror-reflected off the one face of the half mirror and a light beam transmitted through the one face of the half mirror. The retroreflective member has a base material layer and a plurality of prismatic retroreflective elements formed on one face or two faces of the base material layer. The height of the prismatic retroreflective elements is 10 μm or more and 1,000 μm or less. The tilt angle of the optical axis of the prismatic retroreflective elements is zero degree.

16 Claims, 5 Drawing Sheets

(51) Int. Cl.
  *G03B 21/20*   (2006.01)
  *G02B 27/22*   (2018.01)
  *G02B 27/24*   (2006.01)

(56) References Cited

U.S. PATENT DOCUMENTS

| | | | |
|---|---|---|---|
| 4,775,219 A | 10/1988 | Appeldom et al. | |
| 5,706,132 A | 1/1998 | Nestegard et al. | |
| 6,157,486 A * | 12/2000 | Benson, Jr. | G02B 5/124 |
| | | | 359/487.05 |
| 6,685,323 B1 | 2/2004 | Mimura et al. | |
| 7,965,448 B2 | 6/2011 | Maekawa | |
| 8,434,872 B2 * | 5/2013 | Maekawa | G02B 27/2292 |
| | | | 353/10 |
| 8,511,839 B2 | 8/2013 | Mimura et al. | |
| 2003/0021029 A1 | 1/2003 | Mimura et al. | |
| 2004/0173920 A1 | 9/2004 | Erickson et al. | |
| 2006/0007542 A1 | 1/2006 | Smith | |
| 2007/0109641 A1 | 5/2007 | Mimura | |
| 2011/0285965 A1 * | 11/2011 | Sugiyama | G03B 21/28 |
| | | | 353/10 |
| 2012/0038984 A1 * | 2/2012 | Patel | G02B 5/124 |
| | | | 359/530 |
| 2015/0277133 A1 * | 10/2015 | Kaneda | G02B 27/2292 |
| | | | 353/10 |

FOREIGN PATENT DOCUMENTS

| | | |
|---|---|---|
| CA | 2 815 786 | 5/2012 |
| EP | 1 081 511 | 3/2001 |
| EP | 1 698 915 | 9/2006 |
| EP | 1698915 A | 9/2006 |
| EP | 2 192 426 | 6/2010 |
| EP | 2 324 990 | 5/2011 |
| JP | S52-110592 | 9/1977 |
| JP | S59-140021 | 8/1984 |
| JP | S63-143502 | 6/1988 |
| JP | H06-214103 | 8/1994 |
| JP | H10-123309 | 5/1998 |
| JP | 11-53709 A | 2/1999 |
| JP | H11-149006 | 6/1999 |
| JP | H11-305018 | 11/1999 |
| JP | 2000-503417 | 3/2000 |
| JP | 2001-066696 | 3/2001 |
| JP | 2001-290013 | 10/2001 |
| JP | 2002-508085 | 3/2002 |
| JP | 2006-520019 | 8/2006 |
| JP | 2006-521230 | 9/2006 |
| JP | 2009-025776 | 2/2009 |
| JP | 2011-053709 A | 3/2011 |
| JP | 2012-118193 | 6/2012 |
| JP | 2014-016563 | 1/2014 |
| JP | 2015-040943 | 3/2015 |
| WO | 97/026567 | 7/1997 |
| WO | 01/57560 | 8/2001 |
| WO | 2005/054909 | 6/2005 |
| WO | 2009/281692 | 3/2009 |
| WO | 2010/021133 | 2/2010 |
| WO | 2010/067583 | 6/2010 |
| WO | 2012/057295 | 5/2012 |

* cited by examiner

IMAGE DISPLAY DEVICE

This application is a national phase of PCT Application No. PCT/JP2016/067437 filed Jun. 10, 2016, which in turn claims benefit of Japanese Application Nos. 2015-119733 filed Jun. 12, 2015 and 2015-151008 filed Jul. 30, 2015.

TECHNICAL FIELD

The present invention relates to an image display device equipped with a retroreflective member.

BACKGROUND ART

As image display devices that can visually recognize three-dimensional images with no use of dedicated eyeglasses and that include a retroreflective member, an image output device, and a half mirror are widely known.

Patent Literature 1, for example, discloses a three-dimensional image projection system including a projector, a half mirror, and a retroreflective screen. In the projection system, an image projected from the projector is applied to the half mirror and reflected off the surface of the mirror. The image is then applied to the retroreflective screen, and retroreflected at the screen to the half mirror. The image again applied to the half mirror is transmitted through the half mirror, and then a high-quality three-dimensional image is displayed.

Patent Literature 2 discloses an image-forming optical system including a half mirror and a retroreflective element for forming a real mirror image of an object to be projected. In the image-forming optical system, light emitted from the object to be projected is reflected off the half mirror. The light is retroreflected at the retroreflective element to the half mirror, and transmitted through the half mirror. A real mirror image of the object to be projected is formed at a planar symmetric position with respect to the half-mirror surface. Patent Literature 2 discloses that a cube corner reflector including three adjacent mirror faces is suited to the retroreflective element, and that the three mirror faces are directed to given directions in unit retroreflective elements of the retroreflective element, with mutual angles between the three mirror faces being maintained in the unit retroreflective elements.

Here, the retroreflective member will be described.

The sheet-like retroreflective member is specifically referred to as a retroreflective sheeting.

Typical retroreflective sheeting that are known include prismatic retroreflective sheeting and beaded retroreflective sheeting.

The prismatic retroreflective sheeting shows retroreflection performances markedly higher than the retroreflection performances of the beaded retroreflective sheeting. Thus, the prismatic retroreflective sheeting is preferably used for various signs, for example, typified by road signs and construction signs.

A prismatic retroreflective member like a prismatic retroreflective sheeting has a plurality of prismatic retroreflective elements. Commonly, a plurality of prismatic retroreflective elements is formed on one face or two faces of the retroreflective member with no gap.

A typical prismatic retroreflective element includes three planes orthogonal to one another. A light beam entered to the prismatic retroreflective element is in turn reflected off the three planes, and then retroreflected to the direction of the light source.

The prismatic retroreflective elements that are known include triangular pyramid retroreflective elements and full cube corner retroreflective elements, for example.

Typical triangular pyramid retroreflective elements are shown in FIGS. 6A and 6B of Patent Literature 2. As shown in FIG. 6B of Patent Literature 2, the retroreflective elements each of which includes three rectangular equilateral triangles in the same shape and size. The three rectangular equilateral triangles are three planes orthogonal to one another. The triangles form a triangular pyramid. When the retroreflective element is viewed from the front, a regular triangle is formed. As shown in FIG. 6A of Patent Literature 2, the triangular pyramid retroreflective elements are formed (packed) with no gap in the inside of the common plane of the typical triangular pyramid retroreflective elements.

Typical full cube corner retroreflective elements are shown in FIGS. 7A and 7B of Patent Literature 2. As shown in FIG. 7B of Patent Literature 2, the retroreflective elements each of which includes three squares in the same shape and size. The three squares are three planes orthogonal to one another. The squares form a cube. When the retroreflective element is viewed from the front, a regular hexagon is formed. As shown in FIG. 7A of Patent Literature 2, the full cube corner retroreflective elements are formed (packed) with no gap in the inside of the common plane of the typical full cube corner retroreflective member.

An angle formed by the light beam incident on the retroreflective element and the normal to the surface of the retroreflective member (the face to which the light beam is entered) is referred to as the entrance angle. In the case in which a light beam is entered to the retroreflective member in the direction the same as the normal to the retroreflective member, for example, the entrance angle is zero degree.

In the prismatic retroreflective element, the retroreflection performances are suddenly degraded as the entrance angle is increased. This is because an increase in the entrance angle decreases the range where the light beam can be reflected off three planes of the retroreflective elements and increases the range where the light beam can be reflected only off two or one plane. There are known prismatic retroreflective elements with improved performances that maintain retroreflection performances even though light beams are entered at a large entrance angle, i.e. with improved entrance angle characteristics.

Patent Literature 3 discloses triangular pyramid retroreflective elements having the tilt angle of the optical axis in the range of 3 to 15°.

Patent Literature 4 discloses full cube corner retroreflective elements having the tilt angle of the optical axis in the range of 0.5 to 15°.

Commonly, when an angle formed by the light beam incident on the retroreflective element and the optical axis of the retroreflective element is small, the light beam is excellently retroreflected.

[Patent Literature 1] JP-A-2001-66696
[Patent Literature 2] JP-A-2009-25776
[Patent Literature 3] JP-A-11-305018
[Patent Literature 4] WO 2010/067583 A

SUMMARY OF INVENTION

The image display devices equipped with the previously existing retroreflective members have problems in that the brightness of images is insufficient and observers have the difficulty of visually recognizing images.

The present inventors found that the brightness of images displayed by the image display device is improved using a retroreflective member formed with prismatic retroreflective elements having a height of 10 µm or more and 1,000 µm or less and the tilt angle of the optical axis at zero degree. An object of the present invention is to brighten images to be displayed by an image display device and to improve the image forming characteristics (the visibility) of images.

The following is aspects to overcome the problems.

An image display device includes a half mirror, an image output device configured to output a light beam to one face of the half mirror, and a retroreflective member configured to retroreflect at least one of a light beam mirror-reflected off the one face of the half mirror and a light beam transmitted through the one face of the half mirror. The retroreflective member has a base material layer and a plurality of prismatic retroreflective elements formed on one face or two faces of the base material layer. A height of the prismatic retroreflective elements is 10 µm or more and 1,000 µm or less. A tilt angle of an optical axis of the prismatic retroreflective elements is zero degree.

The retroreflective member may be a single layer.

The prismatic retroreflective elements may be triangular pyramid retroreflective elements or full cube corner retroreflective elements.

The prismatic retroreflective elements may be mirror retroreflective elements.

A refractive index of a transparent material included in the prismatic retroreflective elements may be 1.3 or more and 3.0 or less.

A coefficient of retroreflection of the retroreflective member at an observation angle of 0.2° and an entrance angle of 5° may be 800 cd·lx·m$^{-2}$ or more.

The image display device according to the present invention includes a retroreflective member formed with prismatic retroreflective elements whose height is 10 µm or more and 1,000 µm or less and whose tilt angle of the optical axis is zero degree. Accordingly, the image display device can brighten images to be displayed, and can improve the image forming characteristics (the visibility) of images.

DESCRIPTION OF EMBODIMENTS

Figure 1:
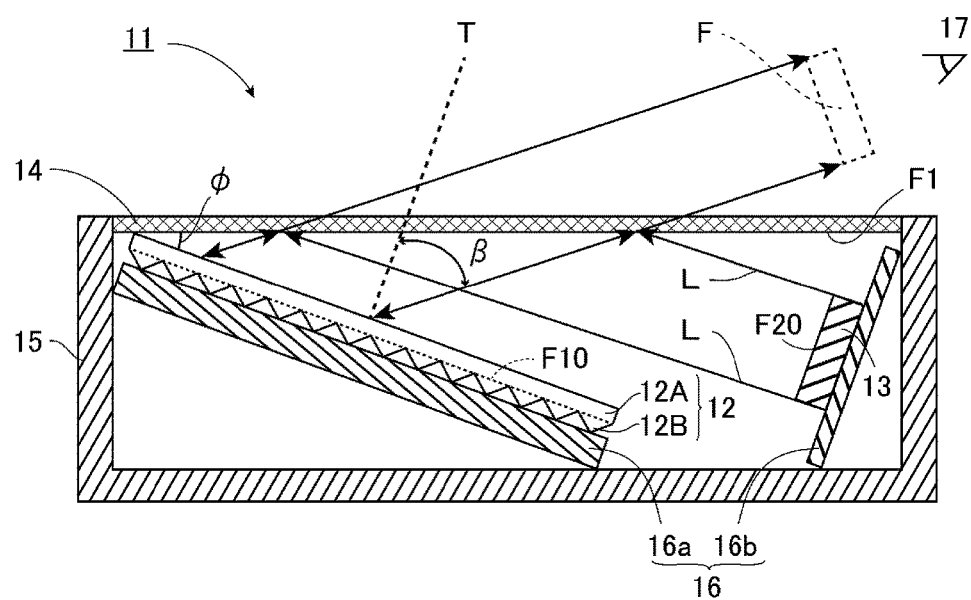
FIG. 1 is a schematic cross-sectional view of an image display device according to a first embodiment of the present invention.

In the following, specific embodiments according to the present invention will be described in detail. The present invention is not limited to the embodiments below, and can be implemented with appropriate modifications and alterations within the scope of an object of the present invention.

In the present specification, a prismatic retroreflective element is also simply referred to as an element. Faces forming the element are also referred to as element faces. The faces of the element that are orthogonal to one another are also referred to as reflective lateral surfaces.

(First Embodiment)
[Image Display Device]

An embodiment that is an example of an image display device according to the present invention will be described with reference to FIG. 1.

An image display device 11 according to the embodiment has a retroreflective member 12, an image output device 13, and a half mirror 14. In the example of the embodiment, the image display device 11 has a box-shaped frame 15 and a base 16, in addition to the retroreflective member 12, the image output device 13, and the half mirror 14.

The frame 15 has a box shape with a bottom wall and sidewalls in which one face is opened. The half mirror 14 covers the opening, and the sidewalls of the frame 15 support the half mirror 14. The retroreflective member 12, the image output device 13, and the base 16 are disposed on the one face F1 side of the half mirror 14, i.e. these components are disposed in the space defined by the frame 15 and the half mirror 14.

The base 16 has a first base 16a on which the retroreflective member 12 is disposed, and a second base 16b on which the image output device 13 is disposed.

An arrangement face F10 of the retroreflective member 12 disposed on the first base 16a is slanted to one face F1 of the half mirror 14. In the example of the embodiment, the retroreflective member 12 includes a sheet-like base material layer 12A and a plurality of retroreflective elements 12B formed protruding from one face, which is the interface, of the base material layer 12A. That is, it can be understood that the retroreflective elements 12B are disposed on the base material layer 12A, with the base material layer 12A and the retroreflective elements 12B integrated with each other. Therefore, the interface is the arrangement face F10.

Note that, although not specifically shown in the drawing, the plurality of retroreflective elements 12B may be formed on two faces of the sheet-like base material layer 12A. For the retroreflective member 12, the base material layer 12A and the plurality of retroreflective elements 12B may be obtained by forming one member or by joining separate members to each other.

An image output face F20 of the image output device 13 disposed on the second base 16b is slanted to the one face F1 of the half mirror 14. The image output device 13 has a screen from which a light beam that is an image is outputted. The screen is the image output face F20.

The arrangement face F10 of the retroreflective member 12 is opposed to the image output face F20 of the image output device 13 with a predetermined angle formed by the faces F10 and F20.

In the image display device 11 thus configured, the image output device 13 outputs a light beam L from the image output face F20, and the half mirror 14 mirror-reflects the light beam L off the one face F1. The retroreflective member 12 then retroreflects the light beam L entered from the base material layer 12A off the plurality of retroreflective elements 12B at an entrance angle β in the direction in which the light beam has been entered. The half mirror 14 transmits the light beam L. Hence, the transmitted light beam L is displayed as an image F.

Commonly, an observer can observe an image F near a position denoted by a view point 17.

Note that, in FIG. 1, T denotes the normal to the surface (the face to which the light beam L is entered) of the retroreflective member 12. Since the surface (the face to which the light beam L is entered) of the retroreflective member 12 is the element face opposed to the apexes of the retroreflective elements 12B, it can also be said that T is the normal to the arrangement face F10 on which the element face is disposed. An angle formed by the normal T and the light beam L incident on the retroreflective member 12 is the entrance angle β.

In the case in which the light beam L is entered to the retroreflective member 12 in parallel with the normal T, the entrance angle β is zero degree.

A reduction in the thickness (a reduction in size) of the image display device 11 is demanded. The image output device 13 is generally expensive. Thus, commonly in the image display device 11, the area of the surface (the arrangement face F10) of the retroreflective member 12 is preferably larger than the area of the output face of the image output device 13. In order to display a large image F, the area of the one face F1 of the half mirror 14 is preferably more increased.

In order to meet various improvements (requests) for the image display device, an angle φ formed by the surface (the arrangement face F10) of the retroreflective member 12 and the one face F1 of the half mirror 14 is preferably 45° or less. In order to achieve various improvements including a reduction in the thickness of the image display device 11, the angle φ formed by the surface (the arrangement face F10) of the retroreflective member 12 and the one face F1 of the half mirror 14 is preferably 5° or more and 40° or less, and more preferably 30° or less.

In order to prevent the light beam L from being directly entered from the image output device 13 to the retroreflective member 12 without being reflected off the half mirror 14, an angle formed by the output face (the image output face F20) of the image output device 13 and the surface (the arrangement face F10) of the retroreflective member 12 is preferably 90° or more, and more preferably 90°.

The image display device 11 according to the present invention is equipped with the specific retroreflective member 12, as described later. Thus, the image display device 11 can meet various improvements including a reduction in the thickness of the image display device 11, and can maintain the visibility of the image F even though the image output device 13 is reduced in size.

The entrance angle β of the light beam L is determined by the positional relationship among the image output device 13, the half mirror 14, and the retroreflective member 12.

The light beam L is entered to the surface (the arrangement face F10) of the retroreflective member 12 at the entrance angle β of above 0° and less than 90°. When an angle formed by the output face (the image output face F20) of the image output device 13 and the surface (the arrangement face F10) of the retroreflective member 12 is 90° and an angle formed by the surface (the arrangement face F10) of the retroreflective member 12 and the one face F1 of the half mirror 14 is 35°, for example, the light beam L is entered to the surface (the arrangement face F10) of the retroreflective member 12 at an entrance angle of 20°.

The image display device 11 according to the present invention is used as a so-called three-dimensional image display device. The image display device 11 is preferably for use in the application of various signboards, information display devices, information input devices, and amusement devices, for example. The image display device according to the present invention has the characteristics that can visually recognize the image F shown on the image display device 11 only from a specific direction. Thus, examples of the possible use of the image display device 11 include providing the image display device 11 according to the present invention as a traffic sign on the road in a manner that the image F is displayed when a vehicle travels on the road in the direction opposite to the formal direction prescribed by the traffic law and the image F is not displayed when a vehicle travels in the formal direction and providing the image display device 11 for use as display devices disposed on escalators and sidewalks for indicating the traveling direction.

According to the image display device 11 of the present invention, since the displayed image F is bright, the observer can sufficiently visually recognize the image F. Since the image F is displayed without coarse resolution, blurs, and any other flaw, i.e. the image forming characteristics are excellent, the observer can sufficiently visually recognize the image F.

[Retroreflective Member]

As described above, the retroreflective elements 12B of the retroreflective member 12 equipped on the image display device 11 include the base material layer 12A and the retroreflective elements 12B formed on one face or two faces of the base material layer 12A. For the retroreflective elements 12B, at least one kind of prismatic retroreflective elements is used among a linear prism element, a cross prism element, a triangular pyramid retroreflective element, a full cube corner retroreflective element, a tent retroreflective element, a cone retroreflective element, and any other retroreflective element. As described above, a plurality of the prismatic retroreflective elements is formed on one face or two faces of the base material layer 12A of the retroreflective member 12. Commonly, the prismatic retroreflective elements are packed (formed) on one face of the base material layer 12A of the retroreflective member 12 with no gap.

The triangular pyramid retroreflective element forms a triangular pyramid shape with three triangle reflective lateral surfaces orthogonal to one another. The full cube corner retroreflective element forms the shape of the full cube corner retroreflective element with three square reflective lateral surfaces orthogonal to one another.

Figure 2A:
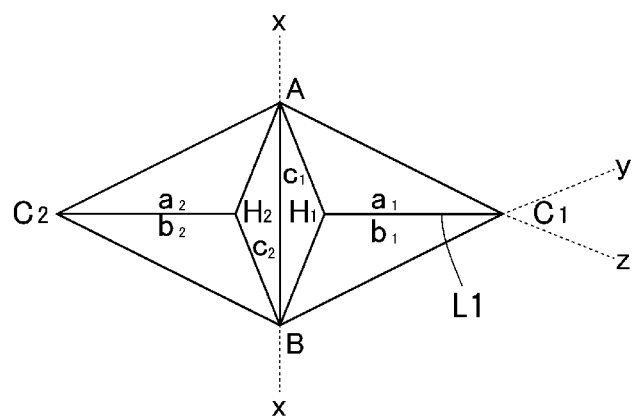
FIG. 2A and FIG. 2B are an example of triangular pyramid retroreflective elements.
Figure 2B:
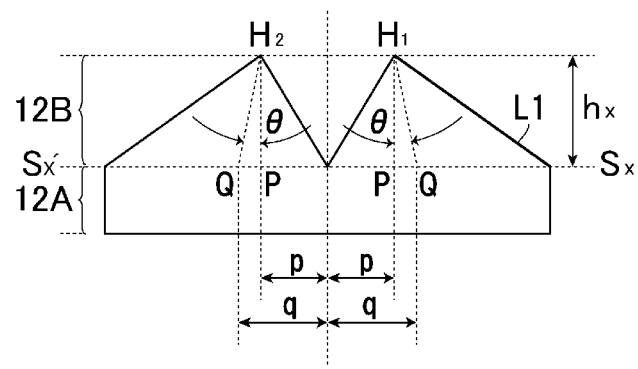
Figure 3A:
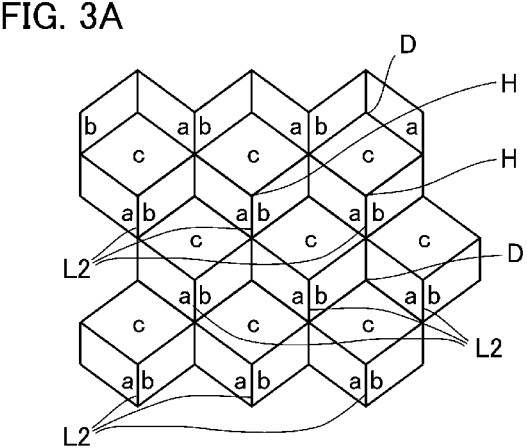
FIG. 3A and FIG. 3B are an example of full cube corner retroreflective elements.
Figure 3B:
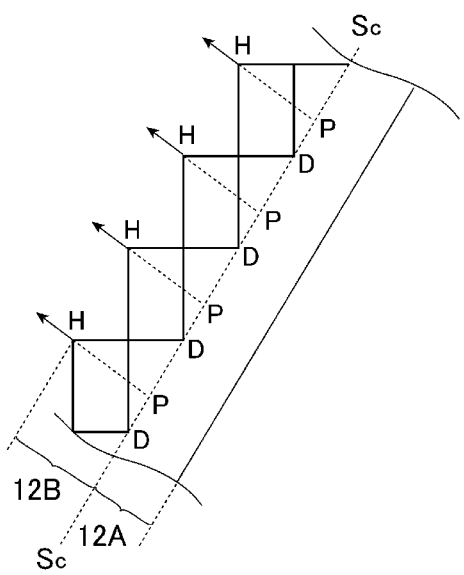

FIGS. 2A and 2B show typical triangular pyramid retroreflective elements. FIGS. 3A and 3B show typical full cube corner retroreflective elements.

The tilt angle of the optical axis of the retroreflective element 12B formed on the base material layer 12A of the retroreflective member 12 equipped on the image display device 11 is zero degree.

In the present specification, the term "the optical axis of the prismatic retroreflective element" means a straight line (axis) defined by equal distances from three reflective lateral surfaces forming the retroreflective element. The term "the tilt angle of the optical axis" means an angle formed by the optical axis and a perpendicular dropped from the apex of the retroreflective element to the common plane of the retroreflective element. The common plane of the retroreflective member is synonymous with the surface of the retroreflective member 12, i.e. the surface to which the light beam is entered (the arrangement face F10). Commonly, the prismatic retroreflective element includes element faces that are reflective lateral surfaces and an element face that is the common plane.

In the triangular pyramid retroreflective elements shown in FIGS. 6A and 6B and the full cube corner retroreflective elements shown in FIGS. 7A and 7B of JP-A-2009-25776, for example, the perpendicular dropped from the apex of the retroreflective element to the common plane of the element and the optical axis are both directed in the same direction in any element, and the tilt angle of the optical axis is zero degree in any element.

Referring to FIGS. 2A and 2B, the tilt angle of the optical axis of the triangular pyramid retroreflective element will be described more in detail.

FIG. 2A is an exemplary plan view of the elements. FIG. 2B is an exemplary cross-sectional view of the elements. Two elements are shown in FIG. 2A and FIG. 2B. These two elements are also referred to as an element pair.

The tilt angle of the optical axis of the prismatic retroreflective element 12B can be found by measuring the element shape. A tilt angle $\theta$ of the optical axis of the triangular pyramid retroreflective elements 12B shown in FIGS. 2A and 2B, which are triangular pyramid elements defined by $ABC_1H_1$, will be described. In FIG. 2B, an optical axis $H_1Q$ is a straight line at equal distances from reflective lateral surfaces $a_1$, $b_1$, and $c_1$ of the element. The tilt angle $\theta$ of the optical axis is defined by an angle formed by the optical axis $H_1Q$ and a perpendicular $H_1P$ dropped from an apex $H_1$ of the element to a bottom face $Sx'$-$Sx$ (the common plane) of the element. The lengths of an edge AB, an edge $BC_1$, and an edge $C_1A$ of the bottom face (a triangle $ABC_1$) of the element are measured, and the conditions, in which the reflective lateral surfaces $a_1$, $b_1$, and $c_1$ of the element are orthogonal to one another, are applied for calculation. This finds the tilt angle $\theta$ of the optical axis. When the lengths of the edge AB, the edge $BC_1$, and the edge $C_1A$ are all 196 µm, for example, in the triangular pyramid retroreflective element) 12B, the tilt angle $\theta$ of the optical axis of the element is zero degree.

Referring to FIGS. 3A and 3B, the tilt angle of the optical axis of the full cube corner retroreflective element will be described more in detail.

FIG. 3A is a front view of the elements. FIG. 3B is an exemplary cross-sectional view of the elements.

The shapes of reflective lateral surfaces a, b, and c of the element shown in FIGS. 3A and 3B have the same square.

As shown in FIG. 3A, the full cube corner retroreflective element 12B is formed of the reflective lateral surfaces a, b, and c that are orthogonal to one another. Points shared by the reflective lateral surfaces a, b, and c are two points, H and D. The apex H is located on the near side of FIG. 3A, and the point D is located on the rear side of FIG. 3A.

In these two points, H is also specifically referred to as an apex.

As shown in FIG. 3B, in the full cube corner retroreflective elements 12B, an element face including a plurality of the points D is defined as a common plane Sc. A point at which a perpendicular dropped from the apex H of the element to the common plane Sc intersects the common plane Sc is defined as P.

The optical axis of the element is a straight line at equal distances from the reflective lateral surfaces a, b, and c. In the case in which the full cube corner retroreflective element is in a cubic shape, i.e. the element includes three squares in the same shape, the optical axis of the element is the same as the diagonal line of the cube.

In the elements shown in FIGS. 3A and 3B, all of the shapes of the reflective lateral surfaces a, b, and c are the same squares. Thus, the optical axis of the elements is the same as the perpendicular HP from the apex H of the element to the common plane Sc. That is, the tilt angle of the optical axis of the elements shown in FIGS. 3A and 3B is zero degree.

The tilt angle of the optical axis of the full cube corner retroreflective element can be found by measuring the element shape similarly to the triangular pyramid retroreflective element.

Note that, the optical axis and the tilt angle of the optical axis are described more in detail in paragraphs 0034 to 0036 of JP-A-10-123309, paragraphs 0031 to 0037 and 0057 to 0060 of JP-A-11-305018, and paragraphs 0052 to 0058 of WO 2010/067583 A.

The height of the element is defined by the distance from the bottom face (the common plane) of the element to the apex of the element. For example, in the case of the triangular pyramid retroreflective elements shown in FIGS. 2A and 2B, the height $H_1P$ of the triangular pyramid retroreflective element in which the lengths of the edge AB, the edge $BC_1$, and the edge $C_1A$ are 196 µm is 80 µm. In the full cube corner retroreflective elements shown in FIGS. 3A and 3B, for example, when the element includes three squares in which the length of one edge is 139 µm, the height HP of the element is 80 µm.

In the present invention, the height of the element is 10 µm or more and 1,000 µm or less. The height of the element is more preferably in the range of 50 µm or more and 250 µm or less, and still more preferably in the range of 65 µm or more and 100 µm or less. Since the height of the element is 10 µm or more, the influence caused by the diffraction effect of the element is small, and the retroreflected light beam is less prone to spread. Thus, the image display device 11 can clearly display the image F. Since the height of the element is 1,000 µm or less, the thickness of the retroreflective member 12 is decreased to achieve a reduction in the thickness of the image display device 11, and the image F can be clearly displayed.

Commonly, when the height of the elements of the retroreflective member 12 exceeds 1,000 µm, the mold shape accuracy for manufacturing the retroreflective member 12 is easily maintained. Thus, the retroreflective member 12 is used for various applications. However, when elements having the height of the element exceeding 1,000 µm are used in the image display device 11 according to the present invention, the resolution of the image F becomes coarse, and this results in extreme degradation of the image forming characteristics. Thus, these elements are not suited. A more decrease in the height of the elements can more improve the image forming characteristics of the image F.

The retroreflective elements are preferably fixed to the base 16 so that the retroreflective elements are directed to enhance the retroreflection performances of the retroreflective member 12.

The elements formed on the base material layer of the retroreflective member 12 are preferably triangular pyramid retroreflective elements or full cube corner retroreflective elements.

When the elements are triangular pyramid retroreflective elements or full cube corner retroreflective elements, a mold for use in manufacture of the retroreflective member 12 can be accurately manufactured. Thus, this configuration is preferable. In design and manufacture of the mold and in manufacture of the retroreflective member, the tilt angle of the optical axis of the element can be easily controlled, and the brightness and the image forming characteristics of the image F are further improved. Thus, this configuration is preferable.

The elements formed on the base material layer of the retroreflective member 12 are more preferably full cube corner retroreflective elements.

Typically, the full cube corner retroreflective elements show the retroreflection performances higher than the retroreflection performances of the triangular pyramid retroreflective elements within a specific entrance angle.

With the configuration equipped with the retroreflective member 12 formed with the full cube corner retroreflective elements, the image display device 11 can display a brighter image F.

The shapes of the retroreflective elements 12B included in the retroreflective member 12 are not specifically limited as long as the tilt angle of the optical axis is zero degree and excellent characteristics of the present invention are not lost. However, in the plurality of element faces of the retroreflective elements 12B, lines (ridge lines) L1 and L2 connecting the element faces to each other are preferably opposed to the image output face F20 of the image output device 13.

As disclosed in JP-T-2002-508085, JP-T-2006-520019, and Domestic Re-publication of PCT patent application WO 2009/028162 A, the element shape may be a cube corner reflector shape formed of two quadrilateral reflective lateral surfaces and one pentagonal or triangle reflective lateral surface.

As disclosed in Domestic Re-publication of PCT patent application WO 2012/57295 A, the element may be an element in a shape in which a part of one or two reflective lateral surfaces of an externally hexagonal element is cut.

As disclosed in JP-T-2000-503417, in one retroreflective member, triangular pyramid retroreflective elements may be disposed, which have shapes different at an angle of 90° (the elements are in rotational symmetry on the arrangement face F10 at an angle of 90°).

The retroreflective member 12 is preferably one layer made up of the same composition, i.e. a single layer. When the retroreflective member 12 is a single layer, this configuration eliminates the reflection between layers, which possibly occurs in a retroreflective member including a multi-layer when the light beam L is entered to the elements. The configuration eliminates optical losses, the displacement of images, blurs, and distortion. Hence, the image display device 11 can display a clear image F, which is preferable. Specifically, the image forming characteristics of moving pictures are improved.

When the retroreflective member 12 is a single layer, this configuration eliminates peelings between layers and bubbles between layers due to heat from the image output device 13, which possibly occur in a multi-layer retroreflective member in the image display device 11, and the image display device 11 can display a clear image F, which is hence preferable. In the case of using a retroreflective member 12 including a base material layer and retroreflective elements formed from a single member, this configuration eliminates peelings between the base material layer and the retroreflective elements and bubbles between the layer and the elements, compared with the case of using a retroreflective member 12 including a separate base material layer joined to separate retroreflective elements. Thus, the image display device 11 can display a clear image F, which is preferable.

Note that, examples of retroreflective members having prismatic retroreflective elements commercially available for the application of various signs include Nikkalite Crystal Grade 92000 series (trade name) manufactured by Nippon Carbide Industries Co., Inc., Diamond Grade DG3 Ultra-High Intensity Reflective Sheeting (trade name) manufactured by 3M Company, and High Intensity Prismatic Grade Reflective Sheeting (trade name) manufactured by 3M Company, which all have a multi-layer structure. More specifically, these retroreflective members have a multi-layer structure in which a surface layer including an acrylic resin is laminated on a retroreflective sheeting including prismatic retroreflective elements and a base material layer both including a polycarbonate, a polyester resin is partially joined so as to form a cell shape, and a pressure sensitive adhesive layer is laminated on the back side of the polyester resin retroreflective member (the back side of the incidence plane of the light beam).

Total internal retroreflective elements and mirror retroreflective elements are known as prismatic retroreflective elements.

From the viewpoint of obtaining a bright image F, total internal retroreflective elements are preferable to the prismatic retroreflective elements equipped on the retroreflective member 12 for use in the image display device 11 according to the present invention. From the viewpoint of improving the image forming characteristics of the image F, mirror retroreflective elements are preferable.

A transparent material included in the total internal retroreflective elements is in contact with air. Since the refractive index difference is present between the transparent material and air, a light beam entered to the element at an angle exceeding the critical angle results in total internal reflection. That is, the light beam entered to the total internal retroreflective element is retroreflected off the reflective lateral surfaces of the element through total internal reflection for three times in total. Note that, the total internal retroreflective element typically has reflection efficiency of 99% or more at the reflective lateral surfaces. Commonly, the retroreflective member 12 having the total internal retroreflective elements shows retroreflection performances higher than the retroreflection performances of the retroreflective member with mirror retroreflective elements. Therefore, in the case in which the retroreflective elements 12B of the retroreflective member 12 are total internal retroreflective elements, the image F can be brightened.

Images outputted from the image display device 11 according to the present invention are made up of various colors, i.e. light beams with different wavelengths. Even a monochrome image has its white made-up of a plurality of light beams with different wavelengths. The transparent material included in the retroreflective elements changes the refractive index when the wavelength of the incident light beam is different, and hence the critical angle is also different. Thus, in the case in which the retroreflective elements 12B of the retroreflective member 12 are total internal retroreflective elements, a part of light beams at a specific wavelength is sometimes not retroreflected. However, in the case in which the retroreflective elements 12B of the retroreflective member 12 are mirror retroreflective elements, the elements can retroreflect light beams regardless of the wavelengths of the light beams to reflect. Therefore, the present inventor considers that when the retroreflective elements 12B of the retroreflective member 12 are mirror retroreflective elements, the image forming characteristics of the image F can be further enhanced.

The mirror retroreflective elements have a mirror reflection layer made of a metal, such as aluminum and silver. Such a mirror reflection layer is provided by vapor deposition, sputtering, and any other method in which a metal layer is formed on the surfaces of each of the prismatic retroreflective elements. The thickness of the mirror reflection layer is not limited specifically as long as light beams can be sufficiently reflected off. However, the thickness ranges from 80 to 200 nm, for example. The light beam entered to the mirror retroreflective element is mirror-reflected off the mirror reflection layer of the element for three times for retroreflection. Note that, in the mirror retroreflective elements, the reflective lateral surfaces each typically have a reflection efficiency of about 90%.

The method for providing the mirror reflection layer on the element is described in JP-A-2001-290013. Commonly, the total internal retroreflective elements show retroreflection performances higher than the retroreflection performances of the mirror retroreflective elements.

Any one element of a total internal retroreflective element and a mirror retroreflective element may be formed on one face or two faces of the base material layer of the retroreflective member 12. From the viewpoint of facilitating manufacturing, the elements to be formed on the base material layer of the retroreflective member 12 are preferably total internal retroreflective elements because of the high retroreflection performances and the easy manufacture of the elements with no process of vapor deposition, sputtering, and any other method.

In another form, in the case of the mirror retroreflective elements having the mirror reflection layer formed on the surfaces of each of the prismatic retroreflective elements, a pressure sensitive adhesive layer is entirely provided on the face of the mirror reflection layer opposed to the prismatic retroreflective elements. With this configuration, the retroreflective member 12 can be arranged on the first base 16a with no distortion, and no distortion occurs in the image F. Consequently, from the viewpoint of providing the retroreflective member 12 on the first base 16a with no distortion, the elements are preferably mirror retroreflective elements.

The retroreflective member 12, which is formed with total internal retroreflective elements commercially available for the application of various signs, is usually used outdoors. In the case of using the retroreflective member outdoors, it is necessary to prevent the degradation of the retroreflection performances. The degradation results from the attachment of water, such as rain and dew condensation, to the surfaces of the elements. Thus, retroreflective members processed in a cell shape are widely used. Such a retroreflective member is disclosed in JP-A-52-110592.

Note that, in the case in which a retroreflective member is processed in a cell shape, a part of retroreflective elements does not satisfy the conditions for total internal reflection, and retroreflection is prone to be reduced even though light beams are entered.

The image display device 11 according to the present invention can use a retroreflective member 12 having total internal retroreflective elements processed in a cell shape. However, when the elements have a portion with reduced retroreflection as described above, the image forming characteristics of the image F are prone to be poor in the case of using the retroreflective member 12 having total internal retroreflective elements processed in a cell shape.

Therefore, in the embodiment, as shown in FIG. 1, the retroreflective member 12 is installed in the space formed by the frame 15 and the half mirror 14, and is not easily affected by rain and any other conditions. Thus, processing the elements in a cell shape is eliminated, and the retroreflective elements may be exposed. With the use of the retroreflective member 12 having the total internal retroreflective elements that are not processed in a cell shape, the retroreflection performances are further improved. This results in a brighter image F to be displayed, and the image forming characteristics are further improved, which are hence preferable.

As shown in FIG. 1, the retroreflective member 12 is commonly installed in the frame 15, and is not affected by rain and any other conditions. Thus, processing the elements in a cell shape is eliminated. With the use of the retroreflective member 12 having the total internal retroreflective elements that are not processed in a cell shape in the image display device 11 according to the present invention, the retroreflection performances are further improved. This results in a brighter image F to be displayed, and the image forming characteristics are especially improved, which are hence preferable.

The retroreflective member 12 is obtained by a method, for example, in which a mold is cut into a predetermined shape, a transparent material, such as a resin, is poured onto the mold, and then the transparent material is hardened.

The detailed method for preparing the mold is described in JP-A-11-149006, for example.

Typical methods for manufacturing the retroreflective member 12 are described in JP-A-59-140021, JP-A-6-214103, JP-T-2006-521230, and Domestic Re-publication of PCT patent application WO 2010/021133 A.

Commonly, the elements formed on the base material layer of the retroreflective member 12 include a transparent material. The term "transparent material" means a material having a total light transmittance of 30% or more. The total light transmittance is measured using Illuminant A in compliance with JIS K7105.

Preferable transparent materials include inorganic materials represented by glass and organic materials represented by acrylic resins, polycarbonates, and polyvinyl chlorides.

In the case in which the retroreflective member 12 is a prismatic retroreflective sheeting, the transparent material of the prismatic retroreflective sheeting may be used alone (a single layer) or a combination of a plurality of transparent materials.

The elements formed on the base material layer of the retroreflective member 12 are preferably and specifically include any one of acrylic resins and polycarbonates because of total light transmittance, formability, durability, and heat resistance, which are all excellent.

The refractive index of the transparent material is preferably 1.3 or more and 3.0 or less, and more preferably 1.45 or more and 1.7 or less. When the refractive index is 1.3 or more, the transparent material is suited to the conditions for total internal reflection, and the retroreflection performances of the retroreflective member 12 are excellent.

Preferable transparent materials include fluororesins (the refractive index ranges from 1.34 to 1.42), acrylic resins (the refractive index ranges from 1.49 to 1.50), polycarbonates (the refractive index is 1.59), polyvinyl chlorides (the refractive index is 1.54), polystyrenes (the refractive index ranges from 1.59 to 1.60), polyesters (the refractive index is 1.60), polyurethanes (the refractive index is 1.49), polypropylene (the refractive index is 1.48), cycloolefin resins (the refractive index ranges from 1.50 to 1.54), and various types of inorganic glass (the refractive index ranges from 1.43 to 2.14).

Note that, the refractive index can be measured in compliance with JIS K7105. In the present specification, the refractive index is the value at a wavelength of 589 nm.

Commonly, the transparent material included in the elements formed on the retroreflective member 12 having the total internal retroreflective elements has more excellent entrance angle characteristics as the refractive index is higher. Because of the refractive index, it has been difficult to use transparent materials with relatively low refractive indexes, for example, fluororesins for the elements. However, fluororesins have excellent heat resistance, and thus fluororesins are useful in the application of optical devices disposed adjacent to the image output device (the light source) like the present invention.

In the retroreflective member 12 equipped on the image display device 11 according to the present invention, the height of the element is 10 µm or more and 1,000 µm or less, and the retroreflective member 12 can reduce the diffraction effect. Thus, a broad range of transparent materials, i.e. transparent materials with any refractive index can be used, and a selection can be made from various kinds of transparent materials to configure the retroreflective member 12.

Polycarbonates are one of preferable transparent materials to the prismatic retroreflective elements because the refractive index is as high as 1.59, and the total light transmittance is as high as 90% or more. However, polycarbonates are hydrolyzed over time when used outdoors, and the total light transmittance is prone to be reduced. Thus, it is difficult to use the prismatic retroreflective elements including a polycarbonate single layer for the application of signs.

However, in the embodiment, the retroreflective member 12 is installed in the frame 15 as mentioned above, and hence the retroreflective member 12 having a polycarbonate single layer can be used.

The transparent materials may be used with various additives added. Polycarbonates containing a heat stabilizer and a refractive index adjustor, for example, may be used for a transparent material included in elements.

The elements formed on the retroreflective members commercially available for the application of signs are designed to retroreflect light beams with a moderate spread so that a driver driving a vehicle can visually recognize signs well. The characteristics of the spread of retroreflected light beams are referred to as observation angle characteristics. Examples of prismatic retroreflective elements with improved observation angle characteristics, i.e. prismatic retroreflective elements designed to moderately spread light beams are disclosed in JP-A-63-143502 and Domestic Republication of PCT patent application WO 2005/054909 A.

The observation angle characteristics of the retroreflective members can be determined by measuring the coefficient of retroreflection under the conditions in which the entrance angle is 5° or 30° and the observation angles are 0.2° and 1.0°, for example.

Here, the term "the coefficient of retroreflection" means a coefficient showing retroreflection performances as defined in JIS Z9117, showing more excellent retroreflection performances as the value is larger.

Note that, the definition of the observation angle is disclosed in JIS Z9117.

The present inventor considers that the observation angle characteristics requested in the retroreflective members having the prismatic retroreflective elements commercially available for the application of signs are unnecessary in the image display device 11, and that a reduction in the spread of the retroreflected light beam, instead, brightens the image F that is displayed on the image display device 11 and hence the image forming characteristics are improved.

Therefore, the coefficient of retroreflection of the retroreflective member 12 equipped on the image display device 11 according to the present invention at an observation angle of 0.2° and an entrance angle of 5° is preferably 800 cd·lx·m$^{-2}$ or more. The coefficient of retroreflection at an observation angle of 1.0° and an entrance angle of 5° is preferably 60 cd·lx·m$^{-2}$ or less.

When the coefficient of retroreflection of the retroreflective member 12 at an entrance angle of 5° is 800 cd·lx·m$^{-2}$ or more, the spread of the light beam is reduced. Thus, the use of the image display device 11 brightens the image F and improves the image forming characteristics. Hence, the use is preferable.

Similarly, when the coefficient of retroreflection at an observation angle of 1.0° and an entrance angle of 5° is cd·lx·m$^{-2}$ or less, the spread of the light beam is reduced.

Thus, the use of the image display device 11 brightens the image F and improves the image forming characteristics. Hence, the use is preferable.

Specifically, when the ratio of the coefficient of retroreflection of the retroreflective member 12 at an observation angle of 0.2° and an entrance angle of 5° to the coefficient of retroreflection at an observation angle of 1.0° and an entrance angle of 5° is 10 or more, preferably 15 or more, and more preferably 30 or more, the image F is further brightened, and the image forming characteristics are further improved, which are hence preferable.

Note that, the coefficient of retroreflection of the retroreflective member 12 can be measured using a reflection performance tester described in JIS Z9117.

The retroreflective member 12 is preferably disposed on the plane of the base 16 having the plane in a manner that the retroreflective member 12 is faced front to front with the half mirror 14. However, the base 16 may have a curved face, and the retroreflective member 12 may be disposed on the curved face.

[Image Output Device]

The image output device 13 equipped on the image display device 11 is not specifically limited as long as the image output device 13 can output light beams (images) with sufficient intensity. Examples of the image output device 13 include liquid crystal displays, LED displays, EL displays, plasma displays, laser displays, and CRTs. Examples of the light source equipped on the image output device 13 include incandescent lamps, fluorescent lamps, high intensity discharge (HID) lamps, LEDs, ELs, and various lasers.

The image output device 13 may be a liquid crystal projector, for example.

Various lenses may be provided on the output face (the image output face F20) of the image output device 13. Various lenses are provided to reduce the image output device 13 in size.

The image display device 11 may have a configuration in which at least two image output devices 13 are provided to output the same images.

Images outputted from the image output device 13 may be any images of still images and moving pictures.

The image display device 11 according to the present invention can brighten the image F and can enhance the image forming characteristics (the visibility) of the image F even though images outputted from the image output device 13 are moving pictures.

[Half Mirror]

The half mirror 14 equipped on the image display device 11 is a plate-shaped member that reflects a part of the incident light beam and transmits a part of the incident light beam. The ratio between the transmittance and the reflectance of the half mirror 14 (transmittance/reflectance) is preferably in the range of 95/5 to 5/95, and more preferably in the range of 80/20 to 20/80.

Examples of the half mirror 14 equipped on the image display device 11 include a film coated with a reflective film on one face of a white board, such as a transparent resin and glass, glass or a film formed with a thin film metal layer on one face by vapor deposition, sputtering, and any other method, a wire grid polarizer, a reflective polarizer, and a beam splitter.

Examples of the half mirror 14 that can be used include ones having aluminum formed on glass by vapor deposition in a thickness of about 50 to 80 nm. Such half mirrors have a mirror specular reflectivity of about 50% and a transmittance of about 50%.

An example of a commercially available half mirror 14 that is a wire grid polarizer preferable to the image display device 11 includes WGF#8408 (trade name) manufactured by ASAHI KASEI E-materials Corp.

Note that, for the transmittance and the reflectance of the half mirror 14, the relative reflectance factor at the entrance angle $\varphi=5°$ was measured using a spectrophotometer (U-4100 Spectrophotometer) manufactured by Hitachi, Ltd. The inner wall of the attached integrating sphere is made up of barium sulfate, and the standard plate is made up of aluminum oxide. Measurement wavelengths were set from 400 nm to 700 nm, the slit was set to 5 nm, the gain was set to two, the scanning rate was measured at 600 nm/min, and the mean value was calculated to determine the transmittance and the reflectance.

[Other Components]

The image display device 11 according to the present invention may be equipped with components other than the retroreflective member 12, the image output device 13, and the half mirror 14.

A quarter-wave plate may be further provided on the face of the retroreflective member 12 to which the light beam is entered, for example. In the configuration of such an image display device 11, a phase difference is given to a linearly polarized light beam in the transmission of a light beam entered from the half mirror 14 through the quarter-wave plate, the light beam is retroreflected off the retroreflective member 12, and a phase difference is again given in the transmission through the quarter-wave plate. Thus, the image display device 11 is preferable because of the ability to display a brighter image F.

Note that, a commercially available example of the quarter-wave plate is F film (trade name) manufactured by Gunze Limited having a cycloolefin polymer base material.

The image display device 11 according to the present invention may display images working together with various sensor cameras. Working together with various sensor cameras, the image display device 11 can be used as a device that can input various manipulations and various items of information to an image F displayed in air through indirect inputs to switches, including a virtual switch, a virtual keyboard, a virtual touch panel, and any other switch.

A member subjected to antireflection processing, such as antireflective (AR) coating, e.g. an antireflection film, is preferably provided on the face of the retroreflective member 12 to which the light beam is entered. With the provision of such a member on the retroreflective member 12, afterglow, which presents overlapped images, for example, is reduced in the image F to be observed, and hence the image forming characteristics are more excellent.

An antireflection layer having a large number of moth-eye structures is preferably provided on the face of the retroreflective member 12 to which the light beam is entered. The term "moth-eye structure" means a structure with micro protuberances, with dimensions equal to or smaller than a wavelength of visible light, e.g. a wavelength of 400 nm. With the provision of the antireflection layer having moth-eye structures on the retroreflective member 12, the image forming characteristics of the image F to be observed are more excellent because of afterglow presentation described above. Note that, an example of the retroreflective member provided with the antireflection layer having a large number of moth-eye structures can be obtained by providing a film having a large number of protuberance structures at a pitch of 250 nm or less and an aspect ratio of 1 or more on its surface on the face of the retroreflective member 12 to which the light beam is entered. The film is MOSMITE (trade name and registered trademark) manufactured by Mitsubishi Rayon Co. Ltd.

(Second Embodiment)

Next, a second embodiment of the present invention will be described in detail with reference to FIG. 4. Note that, components the same as or equivalent to the components of the first embodiment are designated the same reference signs to omit the duplicate description unless otherwise specified.

Figure 4:
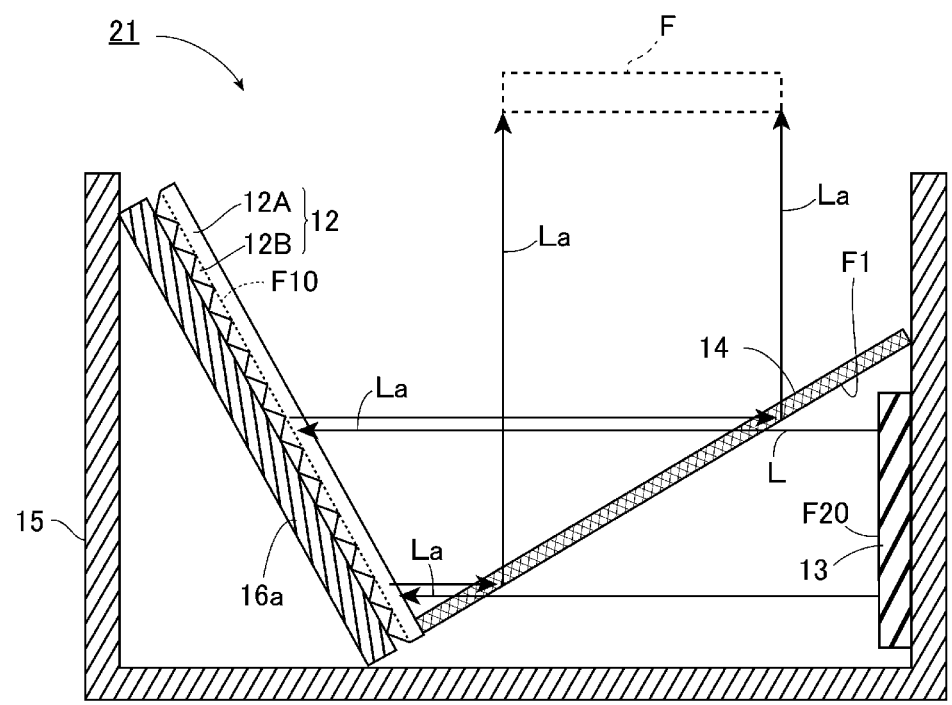
FIG. 4 is a schematic cross-sectional view of an image display device according to a second embodiment of the present invention.

FIG. 4 is a schematic cross-sectional view of an image display device according to the second embodiment of the present invention. As shown in FIG. 4, an image display device 21 according to the embodiment is mainly different from the image display device 11 of the first embodiment in that the image output device 13 is disposed opposite to the retroreflective member 12, with the half mirror 14 provided between the image output device 13 and the retroreflective member 12.

In the embodiment, the image output device 13 is disposed along the wall face of the frame 15, and the half mirror 14 is slanted to the image output face F20 of the image output device 13. The arrangement face F10 of the retroreflective member 12 disposed on the first base 16a is slanted to the image output face F20 of the image output device 13, and forms a predetermined angle with the half mirror 14. In the embodiment, the arrangement face F10 of the retroreflective member 12 is approximately perpendicular to the half mirror 14. However, it may be possible to employ configurations in which the arrangement face F10 is in parallel relation to the image output face F20 of the image output device 13 and the retroreflective member 12 is disposed opposite to the image output face F20 of the image output device 13, and in which the arrangement face F10 of the retroreflective member 12 does not necessarily have to be perpendicular to the half mirror 14.

In the image display device 21 according to the embodiment, a light beam L to form an image is emitted from the image output device 13, and a light beam La that is a part of the light beam L is transmitted through the half mirror 14, and entered to the retroreflective member 12. The light beam La incident on the retroreflective member 12 is retroreflected off the retroreflective elements 12B, directed to the half mirror 14, and a part of the light beam La is reflected off the half mirror 14. Thus, the image F is formed, which is formed by the light beam La reflected off the half mirror 14.

(Third Embodiment)

Next, a third embodiment of the present invention will be described in detail with reference to FIG. 5. Note that, components the same as or equivalent to the components of the second embodiment are designated the same reference signs to omit the duplicate description unless otherwise specified.

Figure 5:
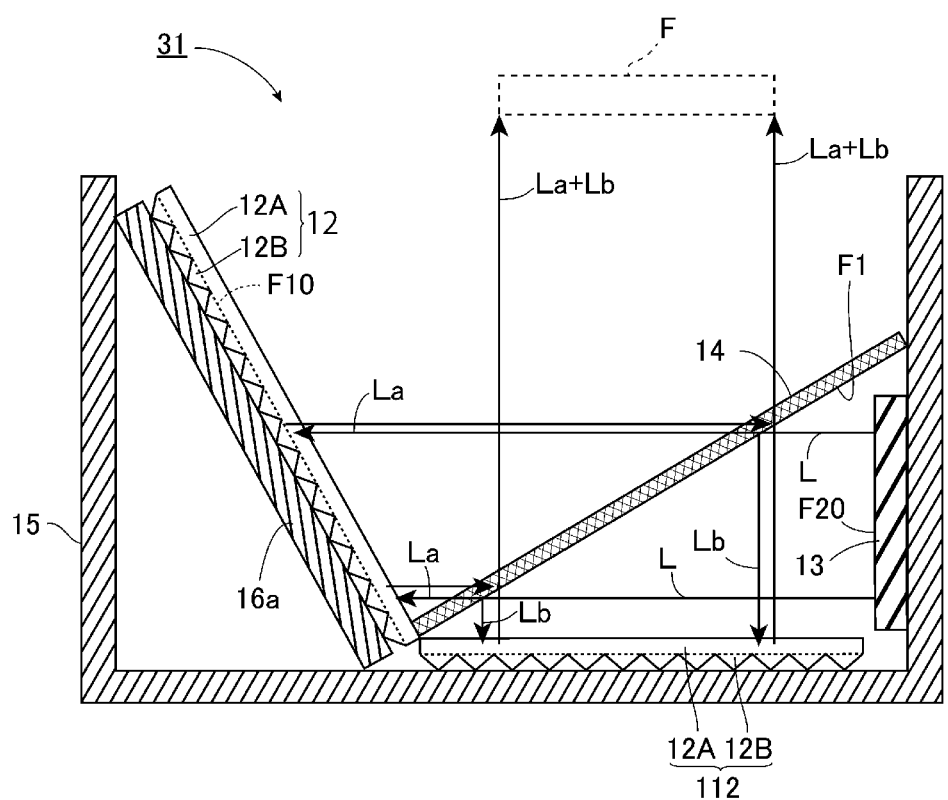
FIG. 5 is a schematic cross-sectional view of an image display device according to a third embodiment of the present invention.

FIG. 5 is a schematic cross-sectional view of an image display device according to the third embodiment of the present invention. As shown in FIG. 5, an image display device 31 according to the embodiment is mainly different from the image display device 21 according to the second embodiment in that a second retroreflective member 112 is further disposed on the same side where the image output device 13 is located relative to the half mirror 14. Therefore, the retroreflective member 112 is disposed opposite to the retroreflective member 12, with the half mirror 14 provided between the retroreflective member 112 and the retroreflective member 12.

The retroreflective member 112 has a configuration similar to the retroreflective member 12. In the embodiment, the retroreflective member 112 is disposed on the bottom wall of the frame 15. Thus, in the embodiment, an arrangement face F10 of the retroreflective member 112 is approximately perpendicular to the screen of the image output device 13. However, the arrangement face F10 of the retroreflective member 112 does not necessarily have to be perpendicular to the screen of the image output device 13. For the retroreflective member 12 and the retroreflective member 112, a configuration may be possible in which one retroreflective member is bent to provide two portions, one of the two portions is the retroreflective member 12, and the other is the retroreflective member 112 relative to the bend.

In the image display device 31 according to the embodiment, a light beam L to form an image is emitted from the image output device 13, and a light beam La that is a part of the light beam L is transmitted through the half mirror 14, and entered to the retroreflective member 12. The light beam La incident on the retroreflective member 12 is retroreflected off the retroreflective elements 12B, directed to the half mirror 14, and a part of the light beam La is reflected off the half mirror 14. Thus, the image F is formed, which is formed by the light beam La reflected off the half mirror 14. The image obtained by the image formed from the light beam La is similar to the image F in the second embodiment.

In the image display device 31 according to the embodiment, a light beam L to form an image is emitted from the image output device 13, a light beam Lb of the light beam L reflected off the half mirror 14 is entered to the retroreflective member 112. The light beam Lb incident on the retroreflective member 112 is retroreflected off the retroreflective elements 12B, and directed to the half mirror 14, and a part of the light beam Lb is transmitted through the half mirror 14. Thus, the light beam Lb reflected off the half mirror 14 forms an image.

In the image display device 31 according to the embodiment, the light beam La and the light beam Lb form an image to form the image F. According to the image display device 31 of the embodiment, the image F is brightened because of the contribution of the light beam Lb, compared with the image display device 21 according to the second embodiment.

EXAMPLES

In the following, the present invention will be described more in detail based on examples. However, the present invention is not limited to these examples unless the present invention exceeds the gist of the present invention.

Example 1

A retroreflective member 12 having triangular pyramid retroreflective elements 12B was prepared. In the triangular pyramid retroreflective elements 12B, the lengths of the edge AB, the edge $BC_1$, and the edge $C_1A$ shown in FIGS. 2A and 2B were 196.0 μm, the height of the element was 80 μm, and the tilt angle θ of the optical axis was 0°. The triangular pyramid retroreflective elements 12B were formed on one face of the base material layer 12A with no gap. This retroreflective member 12 is a retroreflective member having total internal retroreflective elements that are not processed in a cell shape, and includes a polycarbonate single layer with a refractive index of 1.59. The coefficient of retroreflection of the retroreflective member 12 at an observation angle of 0.2° and an entrance angle of 5° was 990 cd·lx·m$^{-2}$, and the coefficient of retroreflection at an observation angle of 1.0° and an entrance angle of 5° was 25 cd·lx·m$^{-2}$.

As shown in FIG. 1, the retroreflective member 12, the image output device 13, the half mirror 14 that was a wire grid polarizer were disposed. An angle formed by the output face (the image output face F20) of the image output device 13 and the surface (the arrangement face F10) of the retroreflective member 12 was set to 90°, the angle φ formed by the surface (the arrangement face F10) of the retroreflective member 12 and the one face F1 of the half mirror 14 was set to 35°, and the entrance angle β of the light beam L incident on the retroreflective member 12 was set to 20°.

Moving pictures were outputted from the image output device 13, and a displayed image F was visually observed. The image F was bright and the image forming characteristics were excellent.

Comparative Example 1

A retroreflective member 12 having triangular pyramid retroreflective elements 12B was prepared. In the triangular pyramid retroreflective elements 12B, the length of the edge AB and the lengths of the edge $BC_1$ and the edge $C_1A$ shown in FIG. 2A, FIG. 2B were 2,940 μm, the height of the element was 1,200 μm, and the tilt angle θ of the optical axis was 0°. The triangular pyramid retroreflective elements 12B were formed on one face of the base material layer 12A with no gap. Instead of the retroreflective member 12 of comparative example 1, an image F was displayed similarly to example 1.

When the image F was visually observed, the image F was dark, compared with example 1, and the image forming characteristics were especially poor.

The image display device according to the present invention can further brighten images to be displayed, and can improve the image forming characteristics (the visibility) of images, compared with previously existing image display devices. The image display device according to the present invention is preferably used for various signboards, information display devices, information input devices, and amusement devices, for example.

REFERENCE SIGNS LIST 11, 21, 31 . . . image display device
12, 112 . . . retroreflective member
13 . . . image output device
14 . . . half mirror
15 . . . frame
16 . . . base
17 . . . view point
L, La, Lb . . . light beam
F . . . image
T . . . normal of the retroreflective member surface

The invention claimed is:
1. An image display device comprising:
a half mirror;
an image output device configured to output a light beam to one face of the half mirror; and
a retroreflective member having a base material layer and a plurality of prismatic retroreflective elements formed on one or two faces of the base material layer, the retroreflective member being configured to retroreflect at least one of a light beam mirror-reflected off the one face of the half mirror and a light beam transmitted through the one face of the half mirror, wherein
a height of the prismatic retroreflective elements is 10 to 1,000 μm, a tilt angle of an optical axis of the prismatic retroreflective elements is zero degrees when the optical axis of the prismatic retroreflective element is a straight line defined by equal distances from three reflective lateral surfaces forming the retroreflective element and the tilt angle of the optical axis is an angle formed by the optical axis and a perpendicular dropped from the apex of the retroreflective element to the common plane of the retroreflective element, and the retroreflective member has a coefficient of retroreflection of 800 cd·lx·m$^{-2}$ or more at an observation angle of 0.2° and an entrance angle of 5°.

2. The image display device according to claim 1, wherein the retroreflective member is a single layer.

3. The image display device according to claim 2, wherein the prismatic retroreflective elements are triangular pyramid retroreflective elements or full cube corner retroreflective elements.

4. The image display device according to claim 3, wherein the prismatic retroreflective elements are mirror retroreflective elements.

5. The image display device according to claim 4, wherein a refractive index of a transparent material included in the prismatic retroreflective elements is 1.3 to 3.0.

6. The image display device according to claim 3, wherein a refractive index of a transparent material included in the prismatic retroreflective elements is 1.3 to 3.0.

7. The image display device according to claim 2, wherein the prismatic retroreflective elements are mirror retroreflective elements.

8. The image display device according to claim 7, wherein a refractive index of a transparent material included in the prismatic retroreflective elements is 1.3 to 3.0.

9. The image display device according to claim 2, wherein a refractive index of a transparent material included in the prismatic retroreflective elements is 1.3 to 3.0.

10. The image display device according to claim 1, wherein the prismatic retroreflective elements are triangular pyramid retroreflective elements or full cube corner retroreflective elements.

11. The image display device according to claim 10, wherein the prismatic retroreflective elements are mirror retroreflective elements.

12. The image display device according to claim 11, wherein a refractive index of a transparent material included in the prismatic retroreflective elements is 1.3 to 3.0.

13. The image display device according to claim 10, wherein a refractive index of a transparent material included in the prismatic retroreflective elements is 1.3 to 3.0.

14. The image display device according to claim 1, wherein the prismatic retroreflective elements are mirror retroreflective elements.

15. The image display device according to claim 14, wherein a refractive index of a transparent material included in the prismatic retroreflective elements is 1.3 to 3.0.

16. The image display device according to claim 1, wherein a refractive index of a transparent material included in the prismatic retroreflective elements is 1.3 to 3.0.

* * * * *

UNITED STATES PATENT AND TRADEMARK OFFICE
CERTIFICATE OF CORRECTION

PATENT NO. : 10,302,954 B2
APPLICATION NO. : 15/577914
DATED : May 28, 2019
INVENTOR(S) : Takuma Houzyou et al.

Page 1 of 1

It is certified that error appears in the above-identified patent and that said Letters Patent is hereby corrected as shown below:

On the Title Page

[56] REFERENCES CITED:
Foreign Patent Document, Page 2, Column 2, Line 27 "WO 2009/0281692 3/2009" should read
--WO 2009/028162 3/2009--

Signed and Sealed this
Tenth Day of December, 2019

Andrei Iancu
*Director of the United States Patent and Trademark Office*